United States Patent
Misan et al.

(10) Patent No.: US 12,254,184 B1
(45) Date of Patent: Mar. 18, 2025

(54) RESPONSE TIME ESTIMATION USING SEQUENCE-TO-SEQUENCE DEEP NEURAL NETWORKS

(71) Applicant: Dell Products L.P., Round Rock, TX (US)

(72) Inventors: Krzysztof Misan, Cracow (PL); Ron Arnan, Nes Ziona (IL); Hagay Dagan, Karkur (IL); Gil Ratsaby, Jerusalem (IL)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/421,263

(22) Filed: Jan. 24, 2024

(51) Int. Cl.
*G06F 3/00* (2006.01)
*G06F 3/06* (2006.01)

(52) U.S. Cl.
CPC .......... *G06F 3/0611* (2013.01); *G06F 3/0655* (2013.01); *G06F 3/067* (2013.01)

(58) Field of Classification Search
CPC ....... G06F 3/0611; G06F 3/0655; G06F 3/067
See application file for complete search history.

(56) References Cited

U.S. PATENT DOCUMENTS

| | | | | |
|---|---|---|---|---|
| 2012/0041914 | A1* | 2/2012 | Tirunagari | G06F 12/121 706/15 |
| 2013/0318022 | A1* | 11/2013 | Yadav | G06N 5/02 706/46 |
| 2017/0373955 | A1* | 12/2017 | Kocoloski | G06F 9/4893 |

OTHER PUBLICATIONS

Wu "Towards Learned Predictability of Storage Systems", Jul. 30, 2023, 33 pages.
Sutskever et al. "sequence to Sequence Learning with Neural Networks" 9 pages.
Hu et al. "A Disk Failure Prediction Method based on LSTM Network Due to its Individual Specificity", ScienceDirect Procedia Computer Science 176 (2020), 9 pages.

* cited by examiner

*Primary Examiner* — Craig S Goldschmidt
(74) *Attorney, Agent, or Firm* — Daly, Crowley, Mofford & Durkee, LLP

(57) ABSTRACT

A method comprising: receiving a first workload data set, the first workload data set specifying a cache hit outcome distribution that is associated with a plurality of input-output (I/O) operations; identifying a plurality of workload portions of the first workload data set, each of the workload portions identifying: (i) a rate of a cache hit outcome that is associated with a respective I/O operation, and (ii) a data size that is associated with the respective I/O operations; generating a plurality of initial vectors, each of the initial vectors being generated based on a different one of the plurality of workload portions, each of the initial vectors being generated by a different sub-network of a correlation neural network; generating a context vector based on the plurality of initial vectors; processing the context vector with a decoder to generate a plurality of data points in a response curve of a storage system.

20 Claims, 7 Drawing Sheets

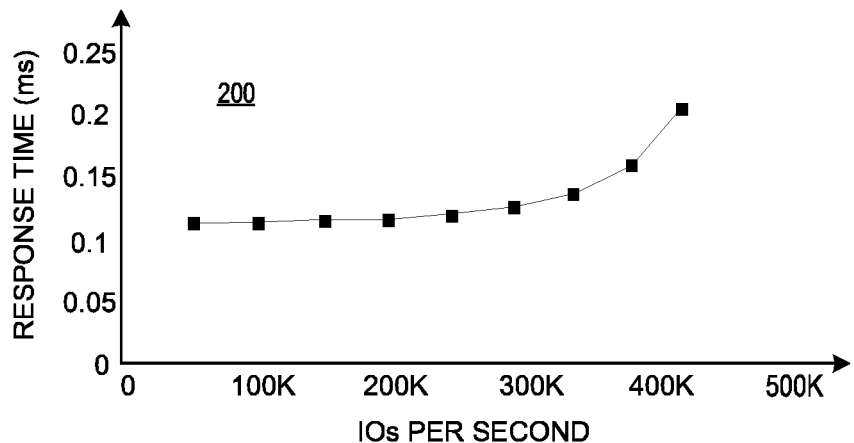

FIG. 2A

| 221 | |
|---|---|
| CACHE HIT RATE FOR RANDOM READS + DATA SIZE ASSOC. WITH THE RANDOM READS 222 | CACHE MISS RATE FOR RANDOM READS + DATA SIZE ASSOC. WITH THE RANDOM READS 224 |
| CACHE HIT RATE FOR RANDOM WRITES + DATA SIZE ASSOC. WITH THE RANDOM WRITES 226 | CACHE MISS RATE FOR RANDOM WRITES + DATA SIZE ASSOC. WITH THE RANDOM WRITES 228 |
| CACHE HIT RATE FOR SEQUENTIAL READS + DATA SIZE ASSOC. WITH THE SEQUENTIAL READS 230 | CACHE MISS RATE FOR SEQUENTIAL WRITES + DATA SIZE ASSOC. WITH THE SEQUENTIAL WRITES 232 |
| MIXED WORKLOAD 218 | |

FIG. 2B

RESPONSE TIME ESTIMATION USING SEQUENCE-TO-SEQUENCE DEEP NEURAL NETWORKS

BACKGROUND

A distributed storage system may include a plurality of storage devices (e.g., storage arrays) to provide data storage to a plurality of nodes. The plurality of storage devices and the plurality of nodes may be situated in the same physical location, or in one or more physically remote locations. The plurality of nodes may be coupled to the storage devices by a high-speed interconnect, such as a switch fabric.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

According to aspect of the disclosure, a method is provided comprising: receiving an input, the input including a first workload data set, the first workload data set specifying a cache hit outcome distribution that is associated with a plurality of input-output (I/O) operations; identifying a plurality of workload portions of the first workload data set, each of the workload portions identifying: (i) a rate of a cache hit outcome that is associated with a respective I/O operation, and (ii) a data size that is associated with the respective I/O operation; generating a plurality of initial vectors, each of the initial vectors being generated based on a different one of the plurality of workload portions, each of the initial vectors being generated by a different sub-network of a correlation neural network; generating a context vector at least in part by concatenating the plurality of initial vectors; processing the context vector with a decoder to generate a plurality of data points in a response time curve of a storage system, wherein the decoder is configured to use autoregression to generate each of the plurality of data points, wherein the decoder is executed iteratively until the plurality of data points is generated, and wherein each of the plurality of data points is generated as a result of a different execution of the decoder; and outputting the set of data points for presentation to a user.

According to aspects of the disclosure, a system is provided, comprising: a memory; and a processing circuitry that is operatively coupled to the memory, the at least one processor being configured to perform the operations of: receiving an input, the input including a first workload data set, the first workload data set specifying a cache hit outcome distribution that is associated with a plurality of input-output (I/O) operations; identifying a plurality of workload portions of the first workload data set, each of the workload portions identifying: (i) a rate of a cache hit outcome that is associated with a respective I/O operation, and (ii) a data size that is associated with the respective I/O operation; generating a plurality of initial vectors, each of the initial vectors being generated based on a different one of the plurality of workload portions, each of the initial vectors being generated by a different sub-network of a correlation neural network; generating a context vector at least in part by concatenating the plurality of initial vectors; processing the context vector with a decoder to generate a plurality of data points in a response time curve of a storage system, wherein the decoder is configured to use autoregression to generate each of the plurality of data points, wherein the decoder is executed iteratively until the plurality of data points is generated, and wherein each of the plurality of data points is generated as a result of a different execution of the decoder; and outputting the set of data points for presentation to a user.

According to aspects of the disclosure, a non-transitory computer-readable medium storing one or more processor-executable instructions, which when executed by one or more processors, further cause the one or more processors to perform the operations of: receiving an input, the input including a first workload data set, the first workload data set specifying a cache hit outcome distribution that is associated with a plurality of input-output (I/O) operations; identifying a plurality of workload portions of the first workload data set, each of the workload portions identifying: (i) a rate of a cache hit outcome that is associated with a respective I/O operation, and (ii) a data size that is associated with the respective I/O operation; generating a plurality of initial vectors, each of the initial vectors being generated based on a different one of the plurality of workload portions, each of the initial vectors being generated by a different sub-network of a correlation neural network; generating a context vector at least in part by concatenating the plurality of initial vectors; processing the context vector with a decoder to generate a plurality of data points in a response time curve of a storage system, wherein the decoder is configured to use autoregression to generate each of the plurality of data points, wherein the decoder is executed iteratively until the plurality of data points is generated, and wherein each of the plurality of data points is generated as a result of a different execution of the decoder; and outputting the set of data points for presentation to a user.

BRIEF DESCRIPTION OF THE DRAWING FIGURES

Other aspects, features, and advantages of the claimed invention will become more fully apparent from the following detailed description, the appended claims, and the accompanying drawings in which like reference numerals identify similar or identical elements. Reference numerals that are introduced in the specification in association with a drawing figure may be repeated in one or more subsequent figures without additional description in the specification in order to provide context for other features.

FIG. 2A is a diagram of an example of a response time curve, according to aspects of the disclosure;

FIG. 2B is a diagram of an example of a workload data set, according to aspects of the disclosure;

DETAILED DESCRIPTION

Measuring the response time of storage systems is essential for assessing their capabilities. For storage systems to meet their response time requirements, they must be tested under different configuration scenarios. However, physically measuring the response time of a storage system could be time-consuming and technically challenging. This makes it difficult to obtain the response times of many different configurations of a storage system under different conditions.

According to aspects of the disclosure, a method is provided that uses a Deep Neural Network to estimate the response time of a storage system. Using the method is advantageous because it allows the response time of storage systems to be estimated without the need to take physical measurements. This in turn permits a greater number of storage systems to be evaluated in a shorter amount of time than one would be able to when using conventional techniques.

Figure 1A:
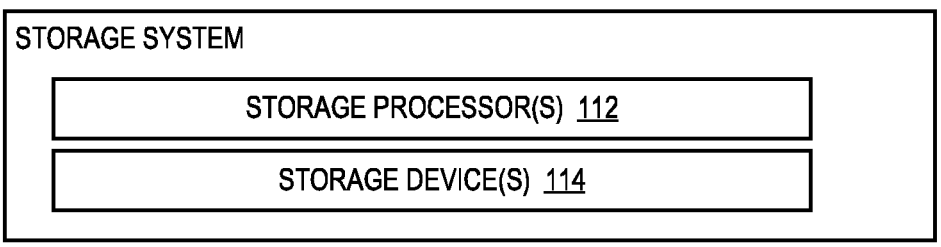
FIG. 1A is a diagram of an example of a storage system, according to aspects of the disclosure.

FIG. 1A is a diagram of an example of a storage system 10 which can be analyzed using the proposed solution. As illustrated, storage system 10 may include a plurality of storage processors 112 and a plurality of storage devices 114. Each of the storage processors 112 may be a computing device that receives I/O requests and executes the I/O requests by reading and writing data to the storage devices 114. Each of the storage devices 114 may include a solid-state drive (SSD), a hard disk (HD), a non-volatile memory express (NVME) device, and/or any other suitable type of storage device. Each of the storage processors 112 may have the same or similar architecture as the computing device 100, which is discussed further below with respect to FIG. 1B. By way of example, storage system 10 may a storage system such as any of the PowerMax™, PoserStore, Vault, XtremIO, which are marketed and sold by the Dell Corporation of Round Rock, TX.

Figure 1B:
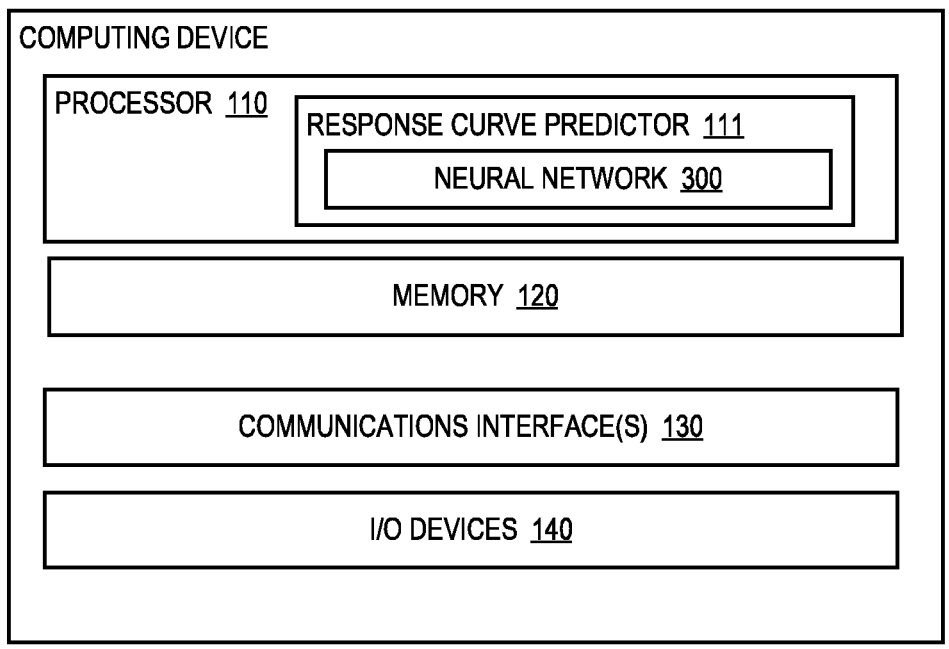
FIG. 1B is a diagram of an example of a computing device, according to aspects of the disclosure.

FIG. 1B is a diagram of an example of a computing device 100, according to aspects of the disclosure. As illustrated, computing device 100 may include a processor 110, a memory 120, one or more communications interfaces 130, and one or more input-output (I/O) devices 140. Processor 110 may include one or more of a general purpose processor (e.g., an x86 processor, a MIPS processor, or a RISC-V processor), an application-specific integrated circuit, a graphics processing unit (GPU), an Artificial Intelligence (AI) accelerator, and or any other suitable type of processing circuitry. Memory 120 may include any suitable type of volatile or non-volatile memory such as an HD, SSD, a random access memory (RAM), a double data rate (DDR) RAM, and/or any other suitable type of memory. The communications interfaces 130 may include one or more of an Ethernet adapter, a Bluetooth adapter, a Host Bus Adapter, a wireless adapter (e.g., a 5G interface), and/or any other suitable type of communications interface. The I/O devices 140 may include one or more of a mouse, a keyboard, a microphone, a speaker, or a display device.

Processor 110 may be configured to execute a response curve predictor. The predictor 111 may be software that implements a neural network 300, which is discussed further below with respect to FIG. 3. The output of predictor 111 may be a response curve such as response curve 200, which is shown in FIG. 2A. Specifically, the output may be a plurality of data points, where each data point corresponds to a different load on storage system 10, and the value of each data point identifies the response time of storage system 10 when storage system 10 is subjected to data point's corresponding load. According to the present example, neural network 300 is implemented in software. However, alternative implementations are possible in which the neural network 300 is implemented in hardware or as a combination of software and hardware.

FIG. 2A shows an example of response curve 200 that is produced by neural network 300, according to aspects of the disclosure. As illustrated, the response curve may include a plurality of data points which are depicted as squares. Each data point identifies the response time of storage system 10 at a different load level. The load level is measured in I/Os per second (IOPS) and the response times are measured in milliseconds. In one example, neural network 300 may produce a series of data points, where each data point corresponds to a different percentage-load of storage system 10. For example, data point 1 may specify the response time of storage system 10 at 10% load of its maximum capacity; point 2 may specify the response time of storage system 10 at 20% load of its maximum capacity, point 3 may specify the response time of storage system 10 at 30% load of its maximum capacity, and so forth. In one example, neural network 300 may generate nine data points, that correspond to 10%, 20%, 30%, 40%, 50%, 60%, 70%, 80%, and 90% of load. In this example, it is up to an output processor that is part of neural network 300 (e.g., output processor 318 shown in FIG. 3) to identify the respective IOPS that corresponds to each load level. After the data points are generated, they may be output by computing device 100 for presentation to a user. Outputting the data points may include one or more transmitting the data points, over a communications network, from computing device 100 to another computing device. In another example, outputting the data points may include generating a curve, such as the response time curve 200, and displaying the curve on a display device. In yet another example, outputting the data points may include displaying, on a display device, the data points in a tabulated form. Stated succinctly the present disclosure is not limited to any specific method for outputting the data points that are part of a response time curve of a storage system.

A specific example of a methodology for generating a training data set is now discussed in further detail. The example is discussed with respect to different models of the PowerMax™ system, which are identified in Table 1 below. Each model may have a different number of storage processors, different storage capacity, and so forth. Although the storage systems identified in Table 1 are different models of the same storage system product, alternative implementations are possible in which different storage system is trained with data corresponding to entirely different storage system products (e.g., Metro™, ExtremeIO, etc.). As illustrated, Table 1 includes a storage system ID and a storage system name. Neural network 300 may be trained to estimate the response time of many different storage systems. In this regard, when neural network 300 is executed, one of the storage IDs in Table 1 may be provided to neural network 300 as input, so as to identify the particular storage system whose response time would be estimated.

TABLE 1

| id | name |
|---|---|
| 1 | 2500-1E |
| 2 | 2500-2E |
| 3 | 8500-1E |
| 4 | 8500-2E |

Figure 2C:
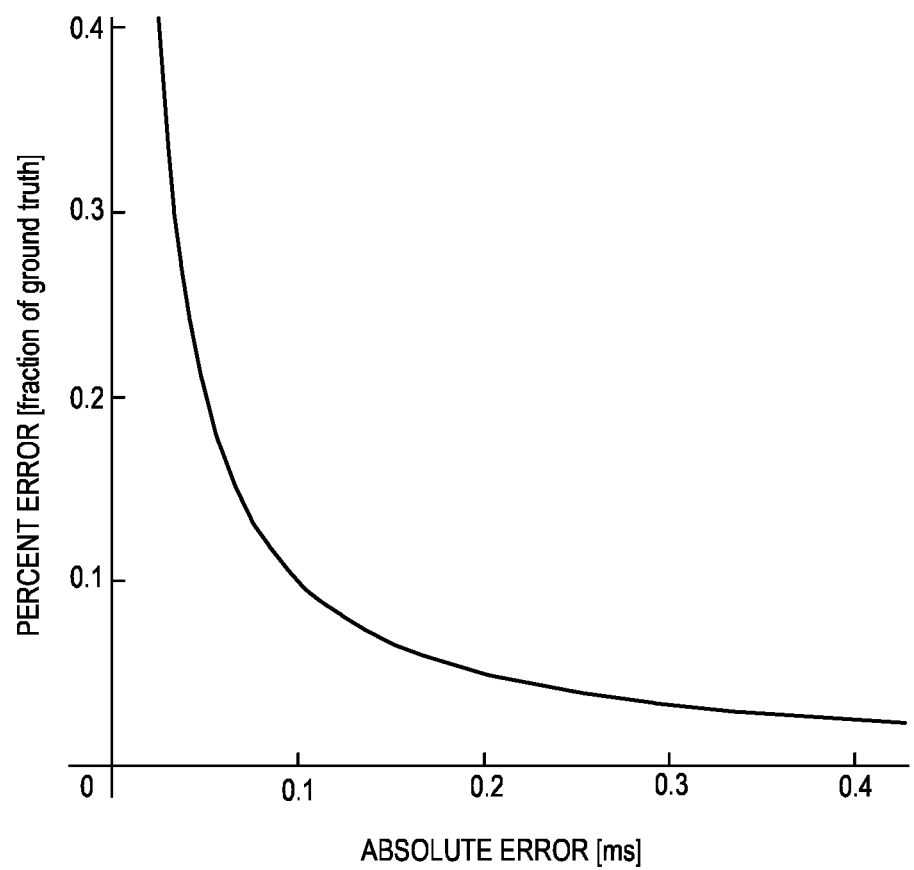
FIG. 2C is a diagram of an example of an error components curve for a loss function, according to aspects of the disclosure.

An example use case for neural network 300 can be described as follows. A customer approaches a sales representative with the intent to buy a storage system. The customer largely knows how many IOPS they need at different times of the day (or month). The customer or the agent may generate a workload distribution, such as the workload distribution 221 which is shown in FIG. 2C. The workload distribution may model different cache hit and cache miss rates for different types of I/Os under different loads. Afterwards, the neural network 300 may be executed multiple times. Each time the neural network 300 may be executed with the same workload data and a different product ID (e.g., a different one of the IDs in the ID column of Table 1). As a result of each execution, a different response time curve would be generated for each storage system whose ID is provided. Afterwards, the customer can look at the response curves and decide which storage system is right for them. In one example, the term "response curve" may refer to a plurality of data points, such as the data points discussed with respect to FIG. 2C or a graph, such as the graph shown in FIG. 2A.

In another use case, a system administrator may measure statistics regarding the cache hit outcome of different instructions in a storage system (e.g., see FIG. 2C). Afterwards, the system administrator may classify the statistics with neural network 300 and obtain the response time curve of the storage system as a result. In this case, using neural network 300 is advantageous because accumulating statistics about the cache hit outcome of different types of instructions is much simpler from a technical standpoint and much less time-consuming than taking physical measurements of the response times (i.e., latencies) of the instructions. In some implementations, the collected statistics may include the average cache hit rate or the average cache miss rate for each of a plurality of instructions (e.g., random read, random write, sequential read, or sequential write).

Figure 4:
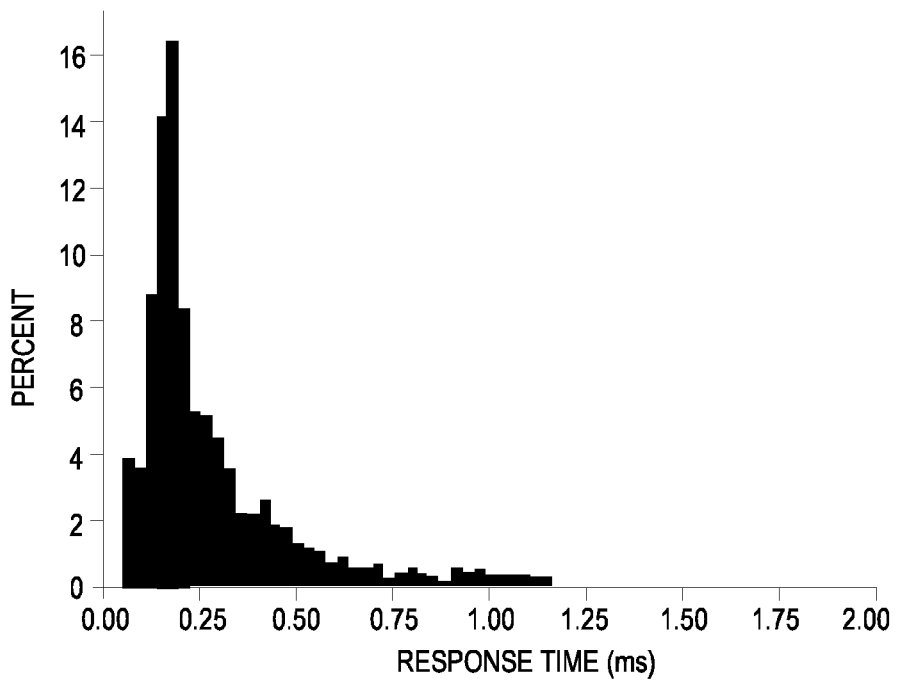
FIG. 4 is a graph of the distribution of response time measurements that are collected for the purpose of training a neural network.

Continuing with the example of a training methodology, the data set for training neural network 300 was obtained by collecting weekly and daily response time measurements for the systems in Table 1, while the systems were subjected to the workloads identified in Table 2 below. The distribution of the collected response time measurements is shown in FIG. 4. A subset of 22 workloads was measured with 0%, 12%, and 100% compression. Remaining measurements were conducted with 0% compression. Outlier values that were identified as faulty measurements were removed by hand or by automatic filtering that is based on the standard deviation of lab measurements. A manual review was performed on the filtering results to confirm that the filtering was performed correctly.

Under the nomenclature of the present disclosure, the collected measurements were processed into workload data sets. In the present example, the collected measurements were arranged in the workload sets (i.e., workloads) which are illustrated in Table 2 below.

TABLE 2

| | | io % | | | | | |
|---|---|---|---|---|---|---|---|
| ID | name | rrh | rwh | rrm | rwm | sr | sw |
| 1 | rrh8k | 100 | 0 | 0 | 0 | 0 | 0 |
| 2 | rrh128k | 100 | 0 | 0 | 0 | 0 | 0 |
| 3 | rrm8k | 0 | 0 | 100 | 0 | 0 | 0 |
| 4 | rrm128k | 0 | 0 | 100 | 0 | 0 | 0 |
| 5 | rwh8k | 0 | 100 | 0 | 0 | 0 | 0 |
| 6 | rwh128k | 0 | 100 | 0 | 0 | 0 | 0 |
| 7 | rwm8k | 0 | 0 | 0 | 100 | 0 | 0 |
| 8 | rwm128k | 0 | 0 | 0 | 100 | 0 | 0 |
| 9 | sr128k | 0 | 0 | 0 | 0 | 100 | 0 |
| 10 | sw128k | 0 | 0 | 0 | 0 | 0 | 100 |
| 11 | rrw7030_8k_0h | 0 | 0 | 70 | 30 | 0 | 0 |
| 12 | rrw7030_8k_100h | 70 | 30 | 0 | 0 | 0 | 0 |
| 13 | rrw7030_128k_0h | 0 | 0 | 70 | 30 | 0 | 0 |
| 14 | rrw7030_128k_100h | 70 | 30 | 0 | 0 | 0 | 0 |
| 15 | rrw7030_8k_50h | 35 | 15 | 35 | 15 | 0 | 0 |
| 16 | rrw7030_128k_50h | 35 | 15 | 35 | 15 | 0 | 0 |
| 17 | dss128k | 18 | 0 | 18 | 4 | 48 | 12 |
| 18 | oltp2hw | 10 | 0 | 35 | 35 | 5 | 15 |
| 19 | dss1mb_a | 5 | 5 | 15 | 15 | 45 | 15 |
| 20 | oltp2_a | 20 | 5 | 45 | 10 | 10 | 10 |
| 21 | sizer1 | 34 | 5 | 24 | 16 | 13 | 8 |
| 22 | teradata_a | 10 | 5 | 60 | 5 | 10 | 10 |

Table 2 provides information about the workload data sets that were collected to use as training data for neural network 300. Each workload set is identified by a numerical identifier having a value between 1 and 22. The acronym rrh stands for "random read cache hit rate" and this value is measured in percentages. The acronym rrm stands for "random read cache miss rate" and this value is measured in percentages. The acronym rwh stands for "random write cache hit rate" and this value is measured in percentages. The acronym rwm stands for "random write cache miss rate" and this value is measured in percentages. The acronym sr stands for "sequential read cache hit rate" and this value is measured in percentages. The acronym sw stands for "sequential write cache miss rate" and this value is measured in percentages.

Further details are now provided for the workloads listed in Table 2. Workload 1 represents only random read requests that resulted in a cache hit when they were executed. The read requests in workload 1 have an associated data size of 8 kb. Workload 2 represents only random read requests that resulted in a cache hit when they were executed. The read requests in workload 2 have an associated data size of 128 kb. Workload 3 represents only random read requests that resulted in a cache miss when they were executed. The read requests in workload 3 have an associated data size of 8 kb. Workload 4 represents only random read requests that resulted in a cache miss when they were executed. The read requests in workload 4 have an associated data size of 128 kb. Workload 5 represents only random write requests that resulted in a cache hit when they were executed. The write requests in workload 5 have an associated data size of 8 kb. Workload 6 represents only random write requests that resulted in a cache hit when they were executed. The write requests in workload 6 have an associated data size of 128 kb. Workload 7 represents only random write requests that resulted in a cache miss when they were executed. The write requests in workload 7 have an associated data size of 8 kb. Workload 8 represents only random write requests that resulted in a cache miss when they were executed. The write requests in workload 8 have an associated data size of 128 kb. Workload 9 represents only sequential read requests that resulted in a cache hit when they were executed. The read requests in workload 9 have an associated data size of 128 kb. Workload 10 represents only sequential write requests that resulted in a cache miss when they were executed. The write requests in workload 10 have an associated data size of 128 kb. According to the present disclosure, the data size associated with a read request is the amount of data that is (was) requested to be read, and the data size associated with a write request is the amount of data that is (was) requested to be written.

In this example, workloads 1-10 are referred to as "pure workloads" because each workload represents only operations of the same type that produce the same cache hit outcome. In other words, each pure workload may consist of exactly one io type (e.g., one of random read, random write, sequential read, or sequential write), and the cache hit outcome for the io type in the workload may be either 100% cache misses or 100% cache hits As a non-limiting example, a pure workload may represent only random read instructions that resulted in a cache hit, but no other types of instructions, or random read instructions that generated a cache miss. As can be readily appreciated, the term "cache hit outcome" refers to either a cache hit or a cache miss. In other words, the cache hit outcome of an instruction would be a cache hit if the instruction generates a cache hit or a cache miss if the instruction results in a cache miss. Workloads 11-22 are mixed workloads. Any one of workloads 11-22 includes represents different types of instructions (e.g., multiple ones of the instruction types discussed above with respect to workloads 1-10). Moreover, the instructions in the mixed workloads may have a different cache hit outcome (i.e., some may have resulted in cache hits while others have resulted in cache misses), and they may have different sizes. For example, a mixed workload may represent random read instructions with cache hit rate of 70% and data size 8 k, and random read instructions with a cache miss rate of 30% and data size of of 4 k.

A mixed workload may be represented as a first vector. The first vector may have the form {IOType1, Size1, IOType2, Size2, IOType3, Size3, IOType4, Size4, IOType5, Size5, IOType6, Size6}. Under the nomenclature of the present disclosure, the first vector may also be referred to as a "workload data set". The names of the variables in the first vector contain the word "IOType" followed by a number, or the word "Size" followed by a number. Each value whose name includes the word "IOType" identifies a respective I/O instruction and a respective cache hit outcome for the instruction. For example, each value bearing the name "IOType" may be a concatenation of an instruction identifier and an indication of a cache hit outcome for the instruction identifier. The indication of a cache hit outcome may be either an indication of a cache hit rate or an indication of a cache miss rate for the instruction. For example, IOType1=rrh100 may correspond to a random read instruction having a cache hit rate of 100% or IOType2=rwm25 may correspond to a random read instruction having a cache miss rate of 25%. In the present example, variable IOType1 may be an identifier of a random read operation having a corresponding cache miss rate, IOType2, may be an identifier of a random write operation having a corresponding cache hit rate, and so fourth.

Each value whose name includes the word "Size" represents the data size that is associated with a respective one of the instructions identified in the first vector. For example, Size1 may be the data size associated with the instruction identified by variable IOType1, Size2 may be the data size associated with the instruction identified by variable IOType2, Size3 may be the data size associated with the instruction identified by variable IOType3, Size4 may be the data size associated with the instruction identified by variable IOType4, and so forth. In some implementations, the workload data set 221 that is discussed further below with respect to FIG. 3 may be the same or similar to the first vector. In other words, as noted above, the first vector may also be referred to as "a workload data set". The phrase "workload data set" is not limited to a particular formatting or representation of the referenced data even though it cold be formatted as a vector. As noted above, a workload data set may specify the cache hit outcome distribution for a set of one or more I/O operations, such as random read, random write, sequential read, or sequential write, by identifying a respective cache hit rate or a respective cache miss rate for each of the I/O operations in the set.

Additionally or alternatively, a pure workload may also be represented using the first vector that is discussed above. However, all values in the first vector, other than IOType1 and Size1 would be set to zero.

The first vector may be the same or similar to the workload data set 221, which is discussed further below with respect to FIG. 2B. Each IOType and Size pair may correspond to a different portion of the workload data set that is represented by the vector. For example, {IOType1, Size1} may correspond to a first portion of the workload data set (e.g., portion 222 which is shown in FIG. 2), {IOType2, Size2} may correspond to a second portion of the workload data set (e.g., portion 224 which is shown in FIG. 2B), and so forth.

A workload data set that is used to train neural network 300 may be associated with a ground truth data set. The ground truth data may include a second vector identifying the respective average response time of a storage system at each of the plurality of loads. For example, the second vector may have the format {rt1, rt2, rt3, rt4, rt5, rt6, and rt7}, where rt1 is the response time of the storage system when the storage system is under a load that is equal to 20% of maximum capacity, rt2 is the response time of the storage system when the storage system is under a load that is equal to 30% of maximum capacity, rt3 is the response time of the storage system when the storage system is under a load that is equal to 40% of maximum capacity, rt4 is the response time of the storage system when the storage system is under a load that is equal to 50% of maximum capacity, rt5 is the response time of the storage system when the storage system is under a load that is equal to 60% of maximum capacity, rt6 is the response time of the storage system when the storage system is under a load that is equal to 70% of maximum capacity, and rt7 is the response time of the storage system when the storage system is under a load that is equal to 80% of maximum capacity. Together, a workload data set and its corresponding ground truth data set may identify the respective response time at which a storage system executes the set of operations specified by the workload data set at each of the plurality of load levels.

The training data used to train neural network 300 may include a plurality of workload data sets and a plurality of ground truth data sets, wherein each of the ground truth data sets corresponds to a different one of the plurality of workload vectors. The ground truth data set for each of the workload data sets may be generated by executing, in a storage system, the operations specified by the workload data set a plurality of times—i.e., for each of the load levels that are associated with the values in the ground truth data set, and measuring the average response time of the storage system at each of the load levels. Some of the plurality of workload data sets may correspond to pure workloads and others of the plurality of workload data sets may correspond to mixed workloads.

For each of the workload data sets, the training data may also include a respective storage system identifier and a respective compression rate identifier. The storage system identifier may be the same as the identifiers discussed above with respect to Table 1 and it may identify the storage system that executed the workload data set and whose respective response times are identified in the ground truth data set for the workload data set. The compression rate identifier may identify the compression rate of the storage system (e.g., in percentage). The respective storage system identifier and compression rate identifier for any given workload data set may be part of system configuration data for that workload data set. An example of system configuration data for a workload data set is discussed further below with respect to FIG. 3 (e.g., see system configuration data 261.)

In the present methodology example, the collected measurements sets were analyzed to extract a response time value distribution. A graph of the distribution is shown in FIG. 4. The extracted distribution was concentrated around lower response time values (e.g., 0.0-0.35 ms) which has to be taken into account when training the model. Due to instability in the 0-10% and 90-100% ranges of the distribution, points were excluded from the training set. This resulted in possible predictions, of one particular example implementation, in the range of 20-80% of the storage system load capacity. For this reason, the ground truth data set in the present example includes response times only for loads in the range of 20-80%.

An example of an error metric that can be used to measure the performance of neural network 300 is now discussed in further detail. Commonly used loss functions were determined to yield insufficient results when it comes to the performance evaluation of neural network 300. The present disclosure minimizes both relative and absolute error as it is well understood that the relative precision of the measurement decreases with the number of iops. Therefore, the solution allows to compensate larger relative errors with better absolute differences. The following describes desirable properties for the loss function: (1) Minimal percentage proximity to the lab result, and (2) Minimal absolute proximity to the lab result. When property (1) holds true, there are scenarios where the percentage error is significant but the absolute error is negligible, which results in error overestimation. When property (2) holds true, there are scenarios where the absolute error effect should be decreased due to the close relative distance. In one example, error calculation for neural network 300 may be performed by using equation 1 below:

$$E = \frac{1}{n} \sum_{i=0}^{n} \frac{(y_{true(i)} - y_{pred(i)})^2}{\max(y_{true(i)}, \epsilon)} \quad (1)$$

The loss function shown in equation 1 results in a symmetrical relation curve x*y between absolute and percentage error for the given E. FIG. 2C shows the error curve for equation 1 for E=0.01. As is well known in the art, the error function is used to estimate the quality of the predictions. It measures the difference between the prediction and actual values using metric appropriate for the training of the particular Neural Network for the given task. If one assumes that x is percent error and y is absolute error then the relation between the two is described by the x*y.

An example is now provided of a methodology for training neural network 300. The training may be performed by using training data, such as the one discussed above. Given the limited amount of available training data, the training data was split to training and validation sets with 90/10 proportion. Increased performance estimation inaccuracy was mitigated by the extensive cross-validation step. Given the very specific nature of the training and validation sets, there may also be additional requirements that could be desirable for the training data used in training neural network 300:

1. According to the present disclosure, it has been determined that pure workloads represent high training value and therefore it is desirable that they be included in the training set.
2. According to the present disclosure, it has been determined that it is desirable for each validation set used in training neural network 300 to be free of outliers The outliers may be test instances with considerable measurement standard deviation.

Figure 5:
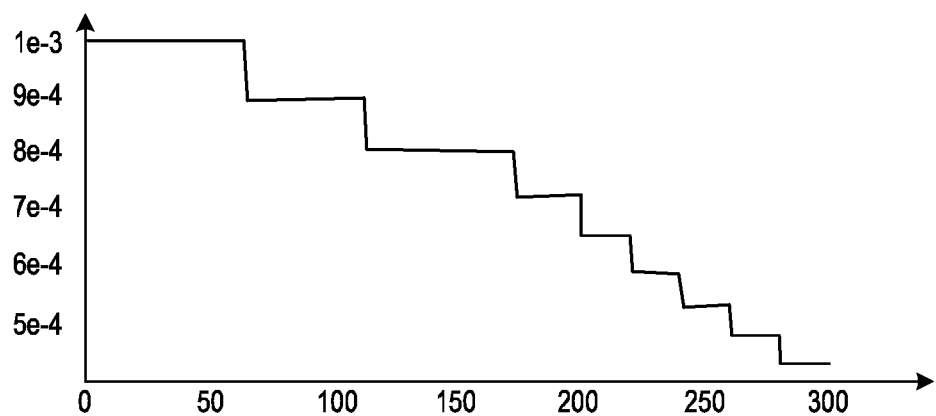
FIG. 5 is a graph of the plateau learning rate of an Adam optimizer, according to aspects of the disclosure.

Neural network 300 may be trained by using an Adam optimizer. The plateau learning rate of the Adam optimizer is shown in FIG. 5. Neural network 300 may be trained until it achieves an improvement on the validation set, which is realized by the early stopping of callback with an appropriate delay. An example of parameters of the optimizer that can be used is provided in Table 3 below.

TABLE 3

| Parameter | Value |
| --- | --- |
| Algorithm | Adam |
| Initial learning rate | 0.001 |
| Learning rate reduction | 0.9 |
| Learning rate patience | 20 |
| Batch size | 32 |

Hyperparameters of neural network 300 may be selected using the best scores achieved during tuning with the Hyperband algorithm. Hyperband is a hyperparameter optimizer, which excels in rapid exploration over the hyperparameter domain. It assumes a finite resource pool and executes short training sequences over a large number of parameter combinations. Combinations that achieve the best performance are repeated with an increased resource pool. The combination set is not closed and new combinations can be introduced after each stage, which allows larger models to allocate sufficient resources in the later iterations of the algorithm. In one example, every parameter set may be evaluated using K-Fold cross-validation, which mitigates the issue of uneven distribution of the dataset by repeatedly sampling the data with uniform distribution. An example of a set of hyperparameters of neural network 300 is listed in Table 4 below.

TABLE 4

| Parameter | Value |
| --- | --- |
| Correlation Network units | 8 |
| Parallel layers in the Correlation Network | 6 |
| Embedding layer units | 1 |
| Metadata non-linear layer units | 64 |
| LSTM cells | 64 |
| Output dense non-linear layers | 1 |
| Output dense non-linear units | 128 |
| Output linear units | 1 |
| Autoregression chance during training | 30% |

Figure 3:
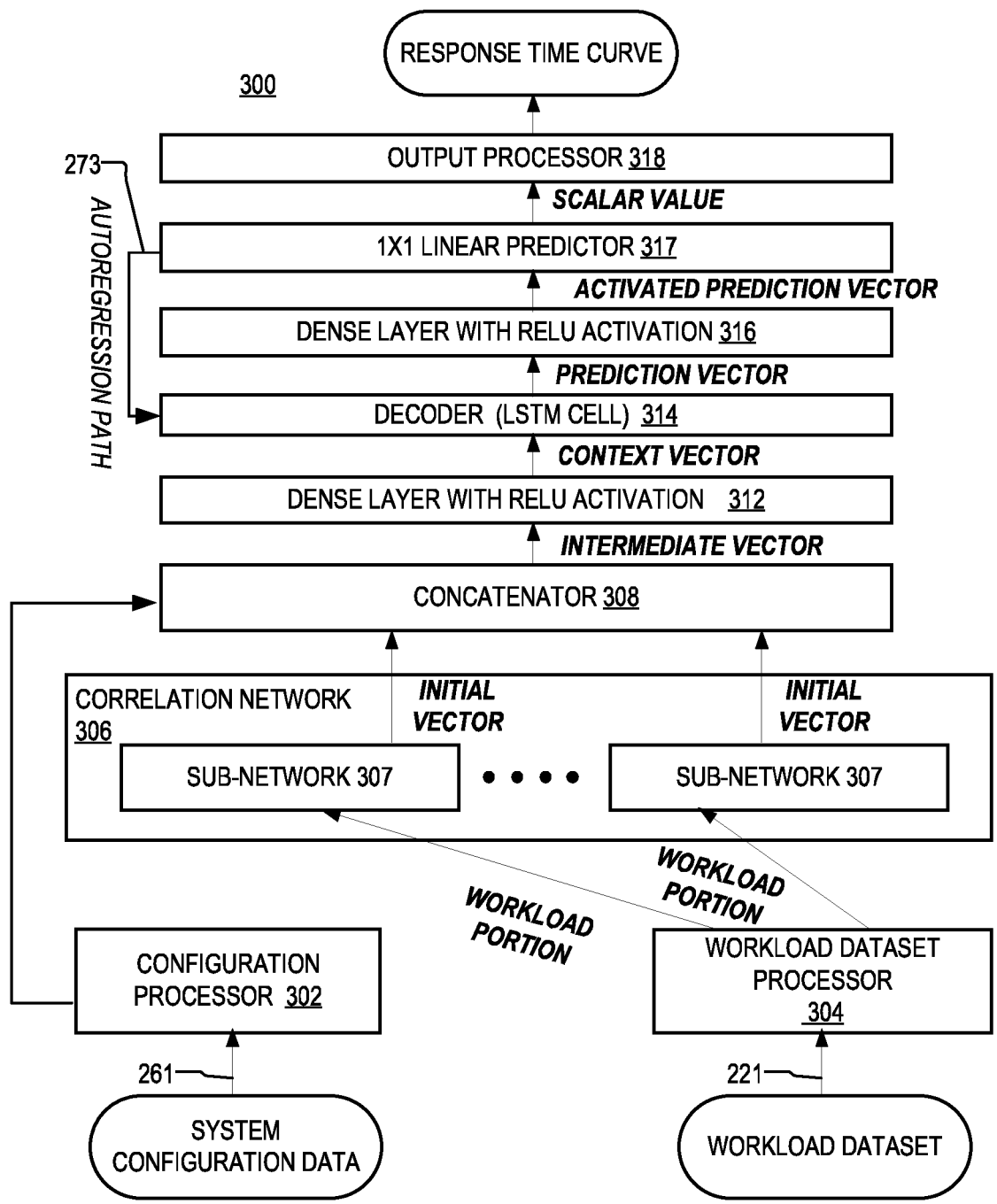
FIG. 3 is a diagram of an example of a training data set, according to aspects of the disclosure.

An example is now provided of one possible implementation of neural network 300. Neural network 300 may be implemented as a DNN (Deep Neural Network) with sequence-to-sequence processing. In some implementations, one of the main features of the architecture of neural network 300 may include a conditioned LSTM (Long Short-Term Memory) cell capable of temporal feature extraction from the response time curve. The LSTM cell may be part of decoder 314, an example of which is shown in FIG. 3. The LSTM cell may receive as input an activated intermediate vector and output a context vector. The context vector may include (e.g., encode or at least partially be based on) workload and configuration metadata. The LSTM cell may predict the n+1 point on the response time curve of a storage system, given point n. During inference, neural network 300 is switched to autoregressive mode where outputs are fed back to the LSTM cell in the next temporal step. Autoregression, in the context of the present disclosure, is defined as a prediction that was based on a previous estimate. The autoregression flow is based on the probability function P(x). The probability function P(x) may be defined as:

$$P(x)=\text{true}; x \leq 0.3$$

$$P(x)=\text{false}; x > 0.3$$

where x is a random variable [0,1] and True/False determine if network uses autoregression or not during a pass.

Neural network 300 may differ from standard sequence-to-sequence architectures. Instead of utilizing Recurrent Neural Network (RNN) or Convolutional Neural Network (CNN) as the Encoder, it offers a different approach that takes advantage of the Multilayer Perceptron (MLP) ability of LSTM cells to process abstract data structures. According to the present example, MLP calculates a context vector and puts it into the initial state of the LSTM. This combination is advantageous because it allows neural network 300 to account for non-sequential data. This allows neural network 300 to learn direct correlations between key metadata variables and find a suitable representation of the metadata to act as a context vector of the decoder states. Another difference between neural network 300 and conventional sequence-to-sequence architectures involves the use of autoregressive paths (e.g., see paths 273 and 274 which are shown in FIG. 3). In a conventional encoder-decoder scenario, autoregressive paths are not used during the training phase as the sequence information is by design passed from the Encoder RNN in the context tensor. By contrast, in neural network 300, the LSTM cell (e.g., decoder 314) places the context vector (shown in FIG. 3) in the initial state of the LSTM. In this approach, autoregression and ground truth values are used with the probabilities 30/70% as the decoder input to improve generalization of the model. This technique prevents neural network 300 from exploding error values due to deterioration of input precision. By utilizing an autoregressive path, the sensitivity of neural network 300 to propagated autoregression error during inference is reduced by a significant amount.

Figure 7:
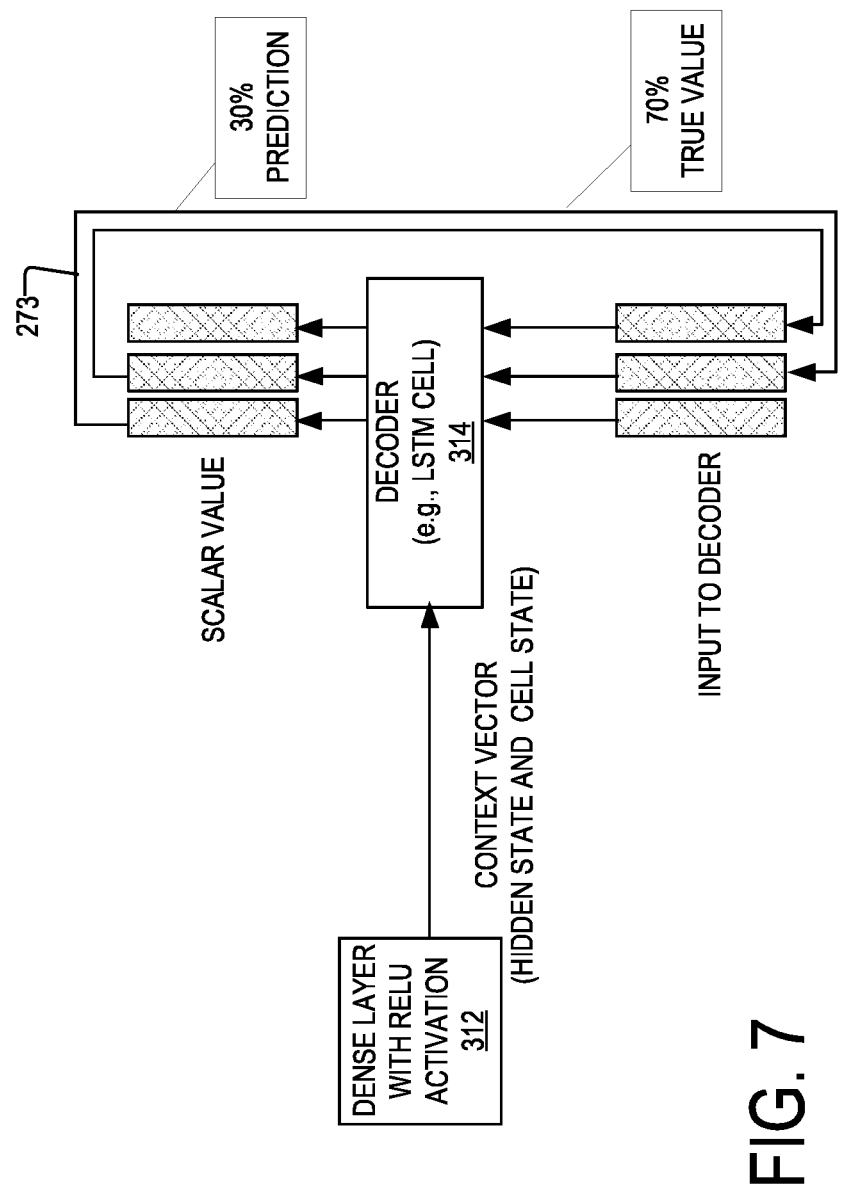
FIG. 7 is a diagram illustrating aspects of the operation of the neural network of FIG. 3, according to aspects of the disclosure.

The LSTM cell may be part of decoder 314, which is shown in FIG. 7. FIG. 7 illustrates that decoder 314 may be arranged to receive a context vector from a layer 312 of neural network 300 (see also FIG. 3), and generate (together with other components of neural network 300), a plurality of scalar values (e.g., see linear predictor 317). The context vector can be input into both the hidden and cell states of the LSTM cell. During the inference stage, each of the generated scalar values (except for the first iteration) is fed beck via an autoregression path 273 to decoder 314, where it is used as a basis for generating the next scalar value. A token may be used to initialize the sequence, and it may be equal to '−1' in one particular implementation. During the training stage, 30% of the generated scalar values that are fed back to decoder 317 may be scalar values that are generated by the neural network, while the remaining 70 percent of the scalar values are ground truth data. In other words, 70% of the scalar values that are placed on autoregression path 273 may be ground truth data and the remaining 30% may be scalar values that are generated by neural network 300 during its training.

During training, the input to neural network 300 may include a workload data set, system configuration data for the workload data set, and a ground truth data set for the workload data set. During the inference stage, the ground truth data set is not necessary as neural network 300 would work in autoregression mode. The output of neural network 300 may include 9 floating point numbers describing the values on the response time curve in the range of 10-90% with discrete intervals of 10%. Although in the present example, the output of neural network 330 includes 9 points in the range 10-90% that are spaced apart at 10% intervals, in an alternative implementation, the output may include 7 points in the range 20-80%. As noted above, in some implementations, outputting values for loads below 20% and above 80% may introduce instabilities into the output of neural network 300.

Each of the floating point numbers may be a different one of the data points discussed above with respect to FIG. 2A. Intermediate values can be obtained with linear interpolation to generate a curve, such as the curve that is shown in FIG. 2A. A more specific example of an architecture of neural network 300, which possesses these properties is provided further below with respect to FIG. 3.

A brief discussion of the performance of neural network 300 is now provided. The performance of neural network 300 was evaluated by using a random validation set with the constraints discussed above. Scoring was performed K times using K-Fold cross-validation, with K=5. The average error between response time measurement and prediction was in the range 4-7% depending on the validation set selection. Overall, 93.27% of the tests performed were found to score below the 10% error threshold on average. This illustrates that the ability of neural network 300 to model non-linear relationships and understand temporal dependencies provide neural network 300 with a significant advantage with respect to response time estimation.

FIG. 2B is a diagram of a workload data set 221. Workload data set 221 may include portions 222-232. Portion 222 may indicate a respective cache hit rate for random read instructions, as well as a data size associated with the random reads. Portion 224 may indicate a respective cache miss rate for random read instructions, as well as a data size associated with the random reads. Portion 226 may indicate a respective cache hit rate for random write instructions, as well as a data size associated with the random writes. Portion 228 may indicate a respective cache miss rate for random write instructions, as well as a data size associated with the random writes. Portion 230 may indicate a respective cache hit rate for sequential read instructions, as well as a data size associated with the sequential read instructions. Portion 232 may indicate a respective cache miss rate for sequential write instructions, as well as a data size associated with the random writes. As can be readily appreciated, workload data set 221 is a mixed workload data set. If workload data set 221 were a pure workload data set, then the workload data set would include only one of portions 222-232. When workload data set 221 is represented as a vector, such as the first vector which discussed above, each portion may correspond to a different IOType and Size pair (e.g., [IOType1, Size1] or [IOType2, Size2], etc.).

The workload data set 221 models the type of load a storage system could be subjected to over the course of its operation. The workload data set 221 may be used both during training of the neural network 300 or during the inference stage of the neural network. When workload data set 221 is used for training neural network 300, workload data set 221 may be accompanied by a ground truth data set that is generated by physically measuring the response times of a storage system while the operations specified in the workload data set 221 are executed at different load levels. When the workload data set 221 is used during the inference stage, no ground truth data set is necessary.

FIG. 3 is a diagram of an example of neural network 300, according to aspects of the disclosure. As illustrated, neural network 300 may include a configuration processor 302, a workload dataset processor 304, an output processor 318, a correlation network 306, a concatenator 308, a dense layer with RELU activation 312 (hereinafter "layer 312"), a decoder 314, a dense layer with RELU activation 316 (hereinafter layer 316), a 1×1 linear predictor 317, and an output processor 318. FIG. 3 illustrates the operation of neural network 300 during the inference stage.

Configuration processor 302 may be configured to receive system configuration data 261 and convert the system configuration data 261 to a format that is accepted by concatenator 308. The system configuration data 261 may include a storage system identifier. Furthermore, in some implementations, the system configuration data 261 may include an indication of a compression rate of the identified storage system. The storage system identifier identifies the storage system whose response time curve would predicted as a result of classifying the workload data set 221. The storage system identifier may be one of the identifiers discussed about with respect to Table 1—i.e., it may be an identifier of one of a plurality of storage systems whose response time neural network 300 is trained to predict.

Workload data processor 304 may be configured to receive the workload data set 221 as input. Workload data processor 304 may be configured to identify each of the portions 222-232 that are part of workload data set 221 and route each of the identified portions to a different sub-network 306 in correlation network 307.

Correlation network 306 may include a plurality of sub-networks 307. Each of the sub-networks 307 may receive a different portion of workload data set 221. Each of the sub-networks 307 may be configured to generate a different respective initial vector based on the workload data set portion that is received at that sub-network 307.

Concatenator 308 may generate an intermediate vector by concatenating with each other the initial vectors and the data provided by configuration processor 302. Layer 312 may generate a context vector based on the intermediate vector. Decoder 314 may generate a prediction vector based on the context vector. Layer 316 may generate an activated prediction vector based on the prediction vector. Linear predictor 317 may compress the activated prediction vector down to a scalar value. As noted above, the scalar value may be a data point in the response curve of a storage system, and it may indicate the response time a storage system will have at a particular load level. In some implementations, each scalar value may be a floating point number. Additionally or alternatively, each scalar value may be the same or similar to one of the data points in the response curve that is discussed above with respect to FIG. 2A.

As noted above, scalar values may be generated one at a time by decoder 314, RELU activator 316, and linear predictor 317. As discussed above, each scalar value, other than the first one, may be generated based on the scalar value that was generated immediately before it. The storage system load level (e.g., 10% of maximum capacity, 20% of maximum storage system capacity, etc.) may be implicit in the order in which the scalar values are generated. In other words, the first scalar value may be associated with a 10% load, the second scalar value may with a load of 20%, and so forth. For the generation of the first scalar value, a special token may be used to initiate the sequence of scalar value. The token may be used as a substitute for a scalar value that is actually generated by neural network 300.

The output processor 318 may perform further processing on the scalar values that are provided by linear predictor 317. For example, based on the order in which the scalar values are generated, the output processor 318 may identify the respective load level that corresponds to each scalar level. The load level may be measured as a percentage of the maximum capacity of the storage system whose response time is being determined. Additionally or alternatively, the output processor 318 may identify the respective IOPS that corresponds to each load level. The mapping between different load levels and IOPS may be provided to output processor 318 in a data structure that is either manually or automatically generated. Additionally or alternatively, the output processor 318 may interpolate the scalar values and generate a response curve graph, such as the one shown in FIG. 2A. Additionally or alternatively, the output processor 318 may output the scalar values for presentation to a user. The output may be performed in the manner discussed above. Each scalar value may be output together with an indication of its corresponding load level or IOPS.

Figure 6:
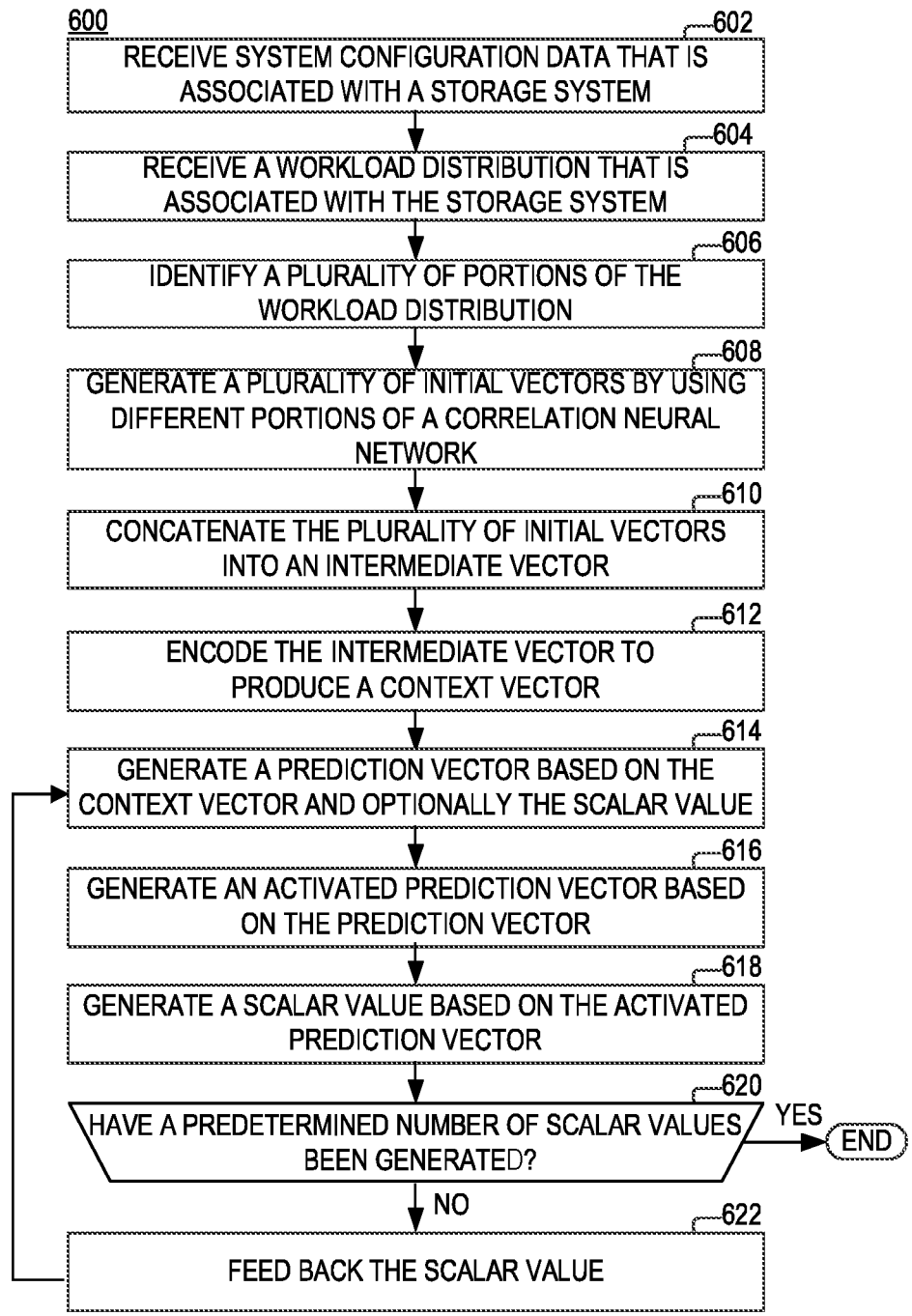
FIG. 6 is a flowchart of an example of a process, according to aspects of the disclosure.

FIG. 6 is a flowchart of an example of a process 600 that is performed by neural network 300, according to aspects of the disclosure.

At step 602, configuration processor 302 receives the system configuration data 261, formats the system configuration data 261 to a format that is acceptable to concatenator 308, and provides the system configuration data 261 to concatenator 308. The system configuration data 261 may be received as user input. As noted above, the system configuration data 261 may identify a particular storage system for which the response time is being determined. Additionally or alternatively, the system configuration data may identify the type of compression that is being practiced by the storage system.

At step 604, configuration processor 302 receives the workload data set 221.

At step 606, configuration processor 302 identifies each of the portions 222-232 in the workload data set 221 and provides each of the identified portions to a different one of the sub-networks 307 which are part of correlation network 306.

At step 608, correlation network 306 generates a plurality of initial vectors and provides the initial vectors to concatenator 308. Each of the initial vectors is generated by a different one of the sub-networks 307 that are part of correlation network 306. Each of the initial vectors is generated based on a different portion of the workload data set. In some implementations, correlation network 306 may have the form of one or more densely connected neurons which produce io type and size dependent context.

At step 610, concatenator 308 generates an intermediate vector and provides the intermediate vector to layer 312. The intermediate vector is generated by concatenating the initial vectors with each other and the configuration data that is provided by configuration processor 302.

At step 612, layer 312 generates a context vector based on the intermediate vector.

At step 614, decoder 314 generates a prediction vector and provides the prediction vector to RELU activator 316. In the first iteration of step 614, the prediction vector is generated based on the context vector and a special token that is provided as a substitute for a scalar value that is output from linear predictor 317. In each subsequent execution of 614, the prediction is generated based on both the context vector and the scalar value that is generated in the most recent iteration of step 618.

At step 616, layer 316 generates an activated prediction vector based on the prediction vector and provides the generated activated prediction vector to linear predictor 317.

At step 618, the linear predictor 317 generates a scalar value. As noted above, the scalar value may be a floating point number that indicates the response time of the storage system (identified by the system configuration data) for a particular load level. Afterwards, linear predictor 317 provides the scalar value to output processor 318.

At step 620, linear predictor 317 detects if a predetermined number of scalar values (e.g., 7 values) has been determined during the execution of process 600. If the predetermined number of scalar values has been determined, process 600 ends. Otherwise, process 600 proceeds to step 622.

At step 622, linear predictor 317 returns the scalar value to decoder 314, after which process 600 returns to step 614 and a new prediction vector is generated based on the context vector and the returned scalar value.

FIGS. 1-6 are provided as an example only. In some embodiments, the term "I/O request" or simply "I/O" may be used to refer to an input or output request. In some embodiments, an I/O request may refer to a data read or write request. At least some of the steps discussed with respect to FIGS. 1-6 may be performed in parallel, in a different order, or altogether omitted. As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

To the extent directional terms are used in the specification and claims (e.g., upper, lower, parallel, perpendicular, etc.), these terms are merely intended to assist in describing and claiming the invention and are not intended to limit the claims in any way. Such terms do not require exactness (e.g., exact perpendicularity or exact parallelism, etc.), but instead it is intended that normal tolerances and ranges apply. Similarly, unless explicitly stated otherwise, each numerical value and range should be interpreted as being approximate as if the word "about", "substantially" or "approximately" preceded the value of the value or range.

Moreover, the terms "system," "component," "module," "interface,", "model" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Although the subject matter described herein may be described in the context of illustrative implementations to process one or more computing application features/operations for a computing application having user-interactive components the subject matter is not limited to these particular embodiments. Rather, the techniques described herein can be applied to any suitable type of user-interactive component execution management methods, systems, platforms, and/or apparatus.

While the exemplary embodiments have been described with respect to processes of circuits, including possible implementation as a single integrated circuit, a multi-chip module, a single card, or a multi-card circuit pack, the described embodiments are not so limited. As would be apparent to one skilled in the art, various functions of circuit elements may also be implemented as processing blocks in a software program. Such software may be employed in, for example, a digital signal processor, micro-controller, or general-purpose computer.

Some embodiments might be implemented in the form of methods and apparatuses for practicing those methods. Described embodiments might also be implemented in the form of program code embodied in tangible media, such as magnetic recording media, optical recording media, solid-state memory, floppy diskettes, CD-ROMs, hard drives, or any other machine-readable storage medium, wherein, when the program code is loaded into and executed by a machine, such as a computer, the machine becomes an apparatus for practicing the claimed invention. Described embodiments might also be implemented in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the claimed invention. When implemented on a general-purpose processor, the program code segments combine with the processor to provide a unique device that operates analogously to specific logic circuits. Described embodiments might also be implemented in the form of a bitstream or other sequence of signal values electrically or optically transmitted through a medium, stored magnetic-field variations in a magnetic recording medium, etc., generated using a method and/or an apparatus of the claimed invention.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments.

Also, for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

It will be further understood that various changes in the details, materials, and arrangements of the parts which have been described and illustrated in order to explain the nature of the claimed invention might be made by those skilled in the art without departing from the scope of the following claims.

The invention claimed is:

1. A method comprising:
receiving an input, the input including a first workload data set, the first workload data set specifying a cache hit outcome distribution that is associated with a plurality of input-output (I/O) operations;
identifying a plurality of workload portions of the first workload data set, each of the workload portions identifying: (i) a rate of a cache hit outcome that is associated with a respective I/O operation, and (ii) a data size that is associated with the respective I/O operation;
generating a plurality of initial vectors, each of the initial vectors being generated based on a different one of the plurality of workload portions, each of the initial vectors being generated by a different sub-network of a correlation neural network;
generating a context vector at least in part by concatenating the plurality of initial vectors;
processing the context vector with a decoder to generate a plurality of data points in a response time curve of a storage system, wherein the decoder is configured to use autoregression to generate each of the plurality of data points, wherein the decoder is executed iteratively until the plurality of data points is generated, and wherein each of the plurality of data points is generated as a result of a different execution of the decoder; and
outputting the set of data points for presentation to a user.

2. The method of claim 1, wherein the decoder is trained based on both ground truth data and autoregression data.

3. The method of claim 1, wherein the correlation neural network is trained by using a training data that includes a plurality of second workload data sets and corresponding ground truth data sets.

4. The method of claim 1, wherein each of the plurality of workload portions identifies either a cache hit rate or a cache miss rate that is associated with the workload portion's I/O instruction.

5. The method of claim 1, wherein the respective I/O operation that is associated with each of the plurality of workload portions is one of a random read operation, random write operation, sequential read operation, or a sequential write operation.

6. The method of claim 1, wherein each of the data points indicates a respective response time which the storage system is expected to have at a different one of a plurality of load levels.

7. The method of claim 1, wherein the input includes an identifier of a configuration that is associated with the storage system.

8. The method of claim 1, wherein, at each execution, the decoder is configured to output a multi-dimensional prediction vector which is subsequently transformed into a scalar value by a 1×1 linear predictor, each scalar value being a different one of the plurality of data points.

9. The method of claim 1, wherein the decoder includes a long short-term memory (LSTM) cell.

10. The method of claim 1, further comprising packaging the plurality of data points into a response time curve for the storage system by at least identifying a respective load value that corresponds to each of the plurality of data points.

11. A system, comprising:
a memory; and
a processing circuitry that is operatively coupled to the memory, the at least one processor being configured to perform the operations of:
receiving an input, the input including a first workload data set, the first workload data set specifying a cache hit outcome distribution that is associated with a plurality of input-output (I/O) operations;
identifying a plurality of workload portions of the first workload data set, each of the workload portions identifying: (i) a rate of a cache hit outcome that is associated with a respective I/O operation, and (ii) a data size that is associated with the respective I/O operation;
generating a plurality of initial vectors, each of the initial vectors being generated based on a different one of the plurality of workload portions, each of the initial vectors being generated by a different sub-network of a correlation neural network;
generating a context vector at least in part by concatenating the plurality of initial vectors;
processing the context vector with a decoder to generate a plurality of data points in a response time curve of a storage system, wherein the decoder is configured to use autoregression to generate each of the plurality of data points, wherein the decoder is executed iteratively until the plurality of data points is generated, and wherein each of the plurality of data points is generated as a result of a different execution of the decoder; and
outputting the set of data points for presentation to a user.

12. The system of claim 11, wherein the decoder is trained based on both ground truth data and autoregression data.

13. The system of claim 11, wherein the correlation neural network is trained by using a training data that includes a plurality of second workload data sets and corresponding ground truth data sets.

14. The system of claim 11, wherein each of the plurality of workload portions identifies either a cache hit rate or a cache miss rate that is associated with the workload' portions I/O instructions.

15. The system of claim 11, wherein the respective I/O operation that is associated with each of the plurality of workload portions is one of a random read operation, random write operation, sequential read operation, or a sequential write operation.

16. The system of claim 11, wherein each of the data points indicates a respective response time which the storage system is expected to have at a different one of a plurality of load levels.

17. The system of claim 11, wherein the input includes an identifier of a configuration that is associated with the storage system.

18. The system of claim 11, wherein the decoder includes a long short-term memory (LSTM) cell.

19. A non-transitory computer-readable medium storing one or more processor-executable instructions, which when executed by one or more processors, further cause the one or more processors to perform the operations of:

receiving an input, the input including a first workload data set, the first workload data set specifying a cache hit outcome distribution that is associated with a plurality of input-output (I/O) operations;

identifying a plurality of workload portions of the first workload data set, each of the workload portions identifying: (i) a rate of a cache hit outcome that is associated with a respective I/O operation, and (ii) a data size that is associated with the respective I/O operation;

generating a plurality of initial vectors, each of the initial vectors being generated based on a different one of the plurality of workload portions, each of the initial vectors being generated by a different sub-network of a correlation neural network;

generating a context vector at least in part by concatenating the plurality of initial vectors;

processing the context vector with a decoder to generate a plurality of data points in a response time curve of a storage system, wherein the decoder is configured to use autoregression to generate each of the plurality of data points, wherein the decoder is executed iteratively until the plurality of data points is generated, and wherein each of the plurality of data points is generated as a result of a different execution of the decoder; and outputting the set of data points for presentation to a user.

20. The non-transitory computer-readable medium of claim 19, wherein the decoder is trained based on both ground truth data and autoregression data.

* * * * *